United States Patent [19]
Weiss et al.

[11] Patent Number: 5,270,909
[45] Date of Patent: Dec. 14, 1993

[54] OPENABLE HANDLE ATTACHMENT

[76] Inventors: Richard S. Weiss, 50 Randelay, St. Louis, Mo. 63124; Jennifer L. Weiss, Ten Mile Island, 222 Creekside Apt. 119C, Frisco, Colo. 80443

[21] Appl. No.: 979,550

[22] Filed: Nov. 20, 1992

[51] Int. Cl.⁵ .................. F21L 15/08; A47B 95/02
[52] U.S. Cl. .................. 362/208; 16/110 R; 220/710.5; 220/756; 362/399
[58] Field of Search ............ 362/190, 205, 208, 295, 362/399; 16/110 R, 114 R, 125, 126; 220/710.5, 756, 762, 766; 215/100 A

[56] References Cited

U.S. PATENT DOCUMENTS

| | | |
|---|---|---|
| 256,983 | 4/1882 | Davis .................. 220/710.5 |
| D. 289,721 | 5/1987 | Havis . |
| D. 291,044 | 7/1987 | Canning . |
| 526,184 | 9/1894 | Gilbert . |
| 1,648,446 | 11/1927 | Currie .................. 362/399 |
| 1,665,055 | 4/1928 | Currie .................. 362/399 |
| 2,416,621 | 2/1947 | Gretschel . |
| 2,501,572 | 3/1950 | Marquez .................. 220/756 |
| 2,524,639 | 10/1950 | Saunders . |
| 2,781,960 | 2/1957 | Dick . |
| 2,922,558 | 1/1960 | Harvey . |
| 3,115,916 | 12/1963 | Stephens .................. 16/110 R |
| 3,563,430 | 2/1971 | Forrest . |
| 3,794,370 | 2/1974 | Lockhart et al. . |
| 4,095,316 | 6/1978 | Gabriel . |
| 4,214,688 | 7/1980 | Griffin, Jr. . |
| 4,333,212 | 6/1982 | Bibollet . |
| 4,556,245 | 12/1985 | Gruenwald . |
| 4,643,326 | 2/1987 | Klingler .................. 220/710.5 |
| 4,685,583 | 8/1987 | Noon .................. 220/710.5 |
| 4,949,889 | 8/1990 | Carson . |
| 5,005,266 | 4/1991 | Fister et al. . |

Primary Examiner—Richard R. Cole
Attorney, Agent, or Firm—Kalish & Gilster

[57] ABSTRACT

An openable handle generally formed as a spring-closing carbiner is provided for attachment to a manually transportable object and has elongated arms connected to the transportable object in spaced relation to each other. The handle is attached to the transportable object so as not to be separable therefrom and one end of the first arm and one end of the second arm each extend outwardly from the attached transportable object. A portion for making the handle openable is located at a site between the outwardly extending ends of the first arm and the second arm, for passage therethrough of a member from which the transportable object is to be suspended.

21 Claims, 8 Drawing Sheets

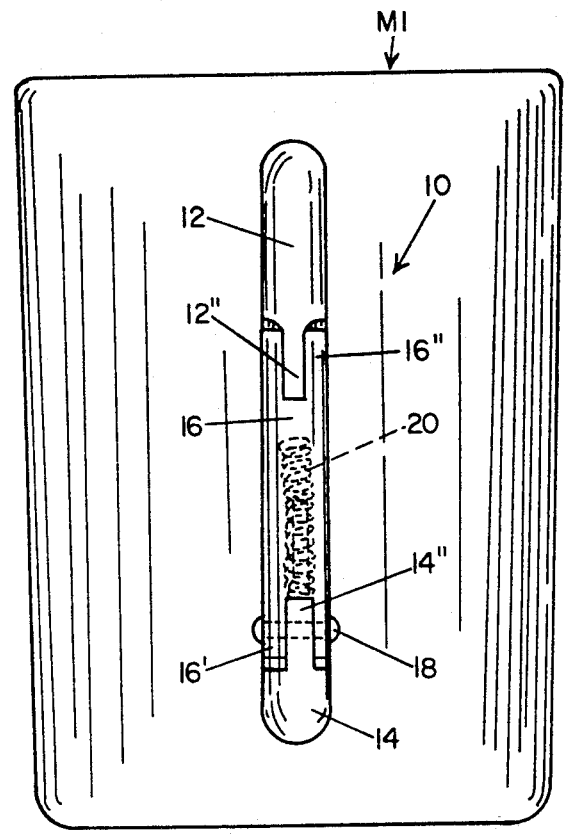
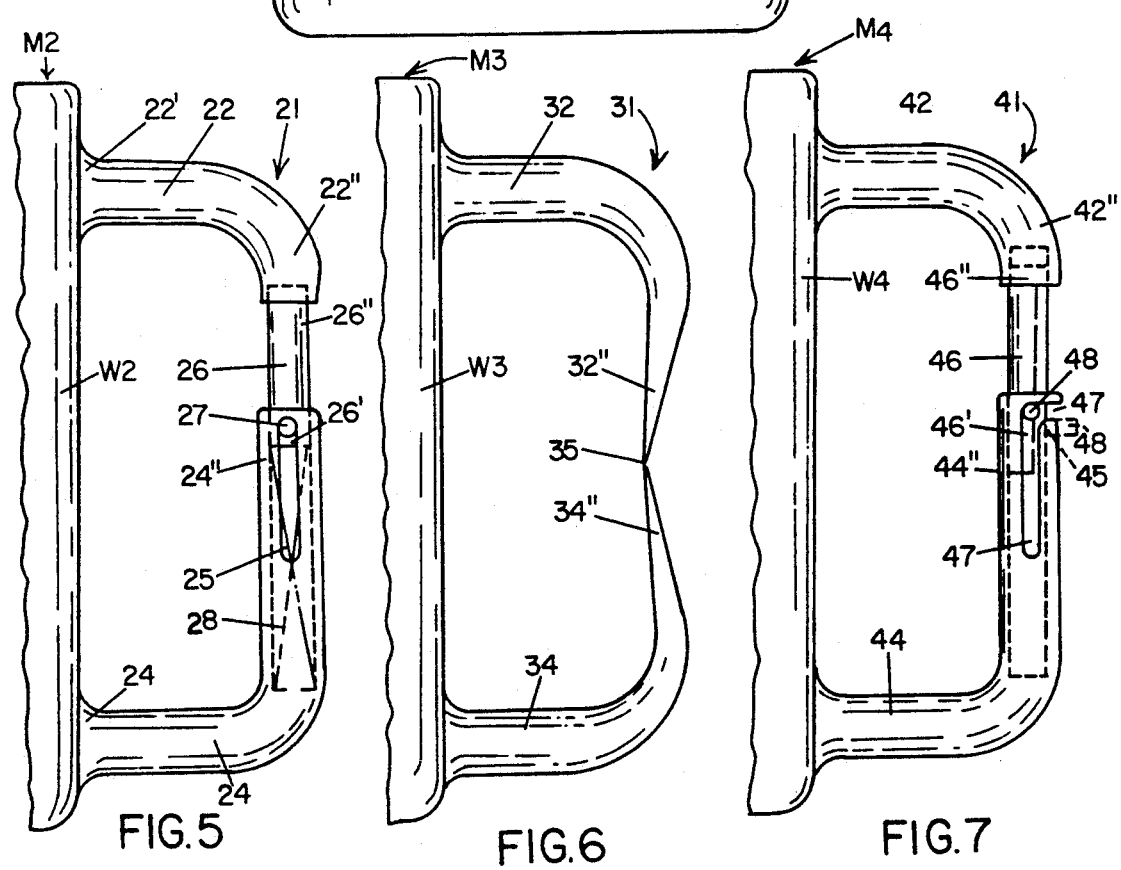
FIG.4
FIG.5  FIG.6  FIG.7

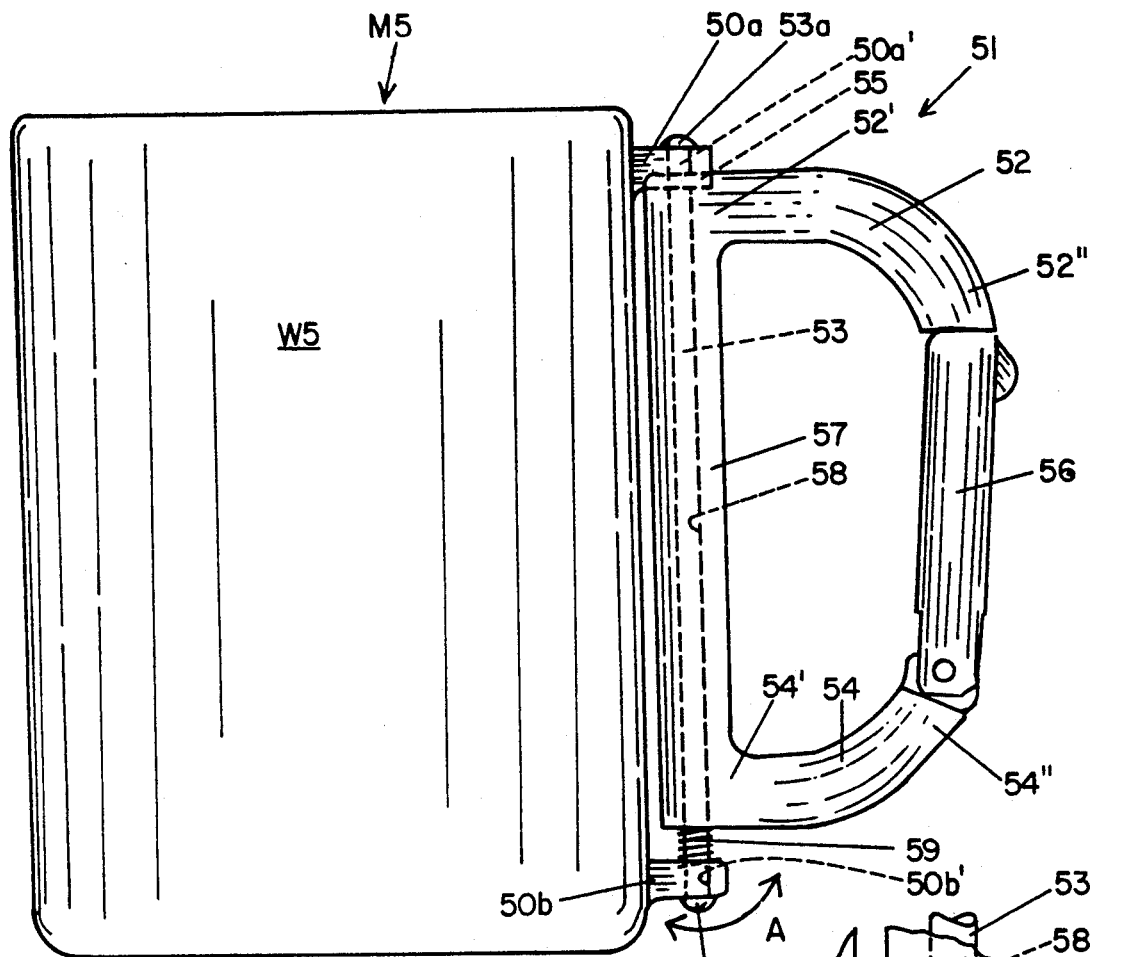
FIG. 8
FIG. 8A
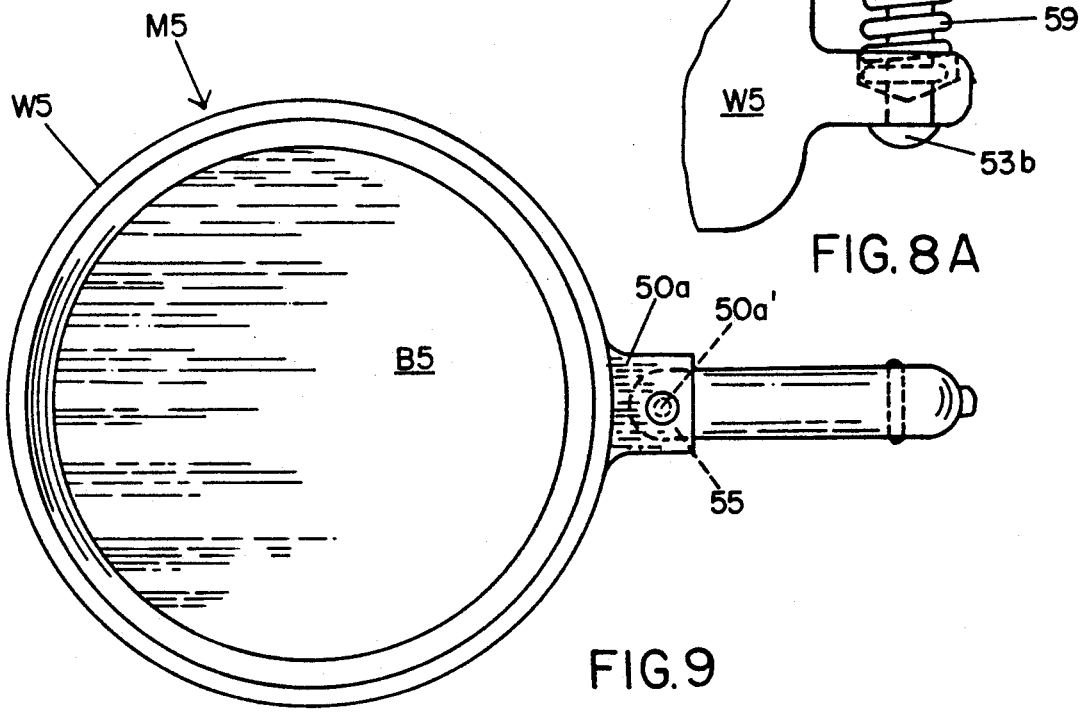
FIG. 9

OPENABLE HANDLE ATTACHMENT

BACKGROUND OF THE INVENTION

1. Field of the Invention

This invention relates, in general, to the field of handles for small articles, and, more specifically, to an openable and reclosable, rigid integral handle attachment for small portable items to permit quick, facile selective attachment to and release from another item, such as a backpack or belt.

2. Description of the Prior Art

Previously there have been known various supports and carrier assemblies for temporary attachment to articles such as thermos bottles and divers, air tanks to facilitate transport thereof. Such supports commonly take the form of some type of handle or strap which is connected to the article to be transported by means of another strap or other elongated material, such as a coil spring, which surrounds such article. An example of the latter is seen in U.S. Pat. No. 2,922,558, which issued to Harvey. The Harvey patent discloses a detachable handle connected at each of its respective ends to a length of coil spring. The springs are of such length as to permit sufficiently tightly surrounding a thermos bottle so that it may be carried by the handle, yet the "give" inherent in the spring permits slidable detachment of the spring and handle assembly from the thermos bottle or other container with which it may be used.

Similarly, U.S. Pat. No. 4,556,245, which issued to Gruenwald, and U.S. Pat. No. 3,794,370, which issued to Lockhart et al. each describe handle assemblies which include straps for surrounding and supporting a small cylinder such as a tank or thermos to be carried by a handle detachably connected to the straps. None of these assemblies includes an openable handle which is permanently attached to the article to be carried thereby.

Likewise, U.S. Pat. No. 4,214,688 and U.S. Pat. No. 2,416,621, which issued to Griffin, Jr., and Gretschel, respectively, teach detachable connectors for transportable articles. More specifically, the patent which issued to Griffin, Jr. discloses a flashlight holder which positively supports the flashlight so as to allow the flashlight to be mounted on the user so that the light can be specifically directed while still leaving the user's hands free. The structure of the holder does not permit it to act as an openable handle for carrying purposes and hand-held use, nor is it permanently fixed to the flashlight or provided integrally therewith.

The Gretschel patent teaches a suitcase handle which can be completely detached from the suitcase in order to prevent theft thereof. The handle is not fixed to the suitcase and formed so as to be openable, as in the present situation, but rather is entirely separable from the suitcase by disassembly of a pivot pin carriage assembly at the ends of the handle.

U.S. Pat. No. 536,184, which issued to Gilbert discloses an attachment to an umbrella handle. The attachment consists of a finger hook connected by a spring-hinged end to the handle of the umbrella. The hook can be released such that a free end thereof may serve to balancingly support the umbrella from the edge of a counter or tabletop to temporarily free the user's hands, or for storage. The hinged open hook does not function as the main means of holding the umbrella for active use thereof, as it is sized only as a finger hold and is not positioned nor shaped in such manner as to provide the strength and balance which permit gripping by a complete hand, as is necessary to manage an open umbrella under the usual conditions in which it would be used. Indeed, any such attempt would likely cause the opened umbrella to topple over, out of the user's grasp.

Thus a need has existed for a handle which is permanently attached as an integral part to a variety of usually small, ordinarily hand-held, portable items and which is selectively openable, yet constructed in such manner to permit the usual use of such item by holding the attached handle. The handle of the present invention, while useful in the ordinary manner as a handle per se, is also adapted for opening, for quick, facile attachment to and release from another object, such as a belt, backpack strap, etc., for hands-free carrying or storage when not in active use. It may also be used as an attachment to slightly larger but still portable articles such as ladders and shovels and other garden tools as a gripping member for carrying the article, and yet being openable for connecting to a ring or loop, for example on a garage wall, or a truck.

In the field of mountain climbing it is known to use a particular type of snap-hook, known as a "carbiner" for fast, strong, reliable connection of one rope to another. Several styles of these carbiners exist, but they are generally formed of a strong metal and have a snap-lock gate-like latch mechanism to permit one-handed operation in precarious positions. Examples of such devices are seen in U.S. Pat. No. 5,005,266, which issued to Fister et al., U.S. Pat. No. 4,333,212, which issued to Bibollet, and U.S. Pat. No. 4,095,316, which issued to Gabriel.

Previously carbiners were used only as connectors providing loose, swinging attachment of one item to another. Now, for the first time known, it is conceived to use such a carbiner structure and modifications thereof as a handle fixedly attached to variety of portable items to permit normal full-handed gripping use of the item, as well as quick, facile connection of the item to some other object. Moreover, variations of the gate-like opening of the new handle attachment are conceived.

SUMMARY OF THE INVENTION

Accordingly, it is among the several objects of the present invention to provide a handle which is suitable for permanent, fixed attachment to any of a wide range of normally portable objects and which is capable of quick, facile opening, ordinarily with one hand, or even one finger, for rapid connection to another object such as a back pack having a strap, or to some other, similar narrow connector such as a belt. It is intended that the new openable handle be an integral part of the item to which it is permanently attached and that it be useful as an ordinary rigid handle therefor in the usual manner, as well as providing a device for convenient, easy connection to and release from another article.

Numerous embodiments of the invention are conceived, for application to a wide variety of small, readily portable objects. As it would be impossible to describe all such embodiments, a representative variety of same will be described at first generally and then in greater detail below.

Thus, in furtherance of the above objects, the present invention is, briefly, an openable handle for attachment to a portable object. The handle includes an elongated first arm having first and second opposed ends and extending therebetween and an elongated second arm having first and second opposed ends and extending therebetween. The first arm and the second arm are each connected to the object by the corresponding first ends thereof in spaced relation to each other and in such manner that the handle is attached to the object so as not to be separable therefrom. The second end of the first arm and the second end of the second arm each extend outwardly from the object attached to the handle and define therebetween a site for locating a portion for making the handle openable. The portion for making the handle openable permits selective passage therethrough of a member from which the object is to be suspended.

Also in keeping with the invention, the member for making the handle openable is an elongated member having first and second opposed ends and extending therebetween. The first end of the elongated member is pivotally connected to the second end of either the first arm or the second arm and the second end of the elongated member is adapted for selectively openable latchable connection to the second end of the other of the first arm and the second arm.

The invention may further include, briefly, that the handle has a carbiner-like form including an elongated back portion having first and second opposed ends. The first arm of the handle extends from the first end of the back portion and the second arm of the handle extends from the second end of the back portion, and the back portion is longitudinally fixed to the object.

Other objects and advantages will be in part apparent and in part pointed out hereinbelow.

BRIEF DESCRIPTION OF THE DRAWINGS

FIG. 4 is a handle side elevational view of the mug of FIG. 1.

FIG. 5 is a front elevational view of a mug, partially broken away, showing a variation of the openable handle attachment constructed in accordance with and embodying the present invention.

FIG. 6 is a front elevational view of a mug, partially broken away, showing a further variation of the openable handle attachment constructed in accordance with and embodying the present invention.

FIG. 7 is a front elevational view of a mug, partially broken away showing a still further variation of the openable handle attachment constructed in accordance with and embodying the present invention.

FIG. 8 is a front elevational view of a mug having yet another variation of the openable handle attachment constructed in accordance with and embodying the present invention.

FIG. 8A is a partial, broken-away enlarged view of the lower end of the handle attachment of FIG. 8.

FIG. 9 is a top plan view of the mug of FIG. 8.

Throughout the various figures like parts are indicated by like element numbers.

DESCRIPTION OF PRACTICAL EMBODIMENTS OF THE INVENTION

Figure 1:
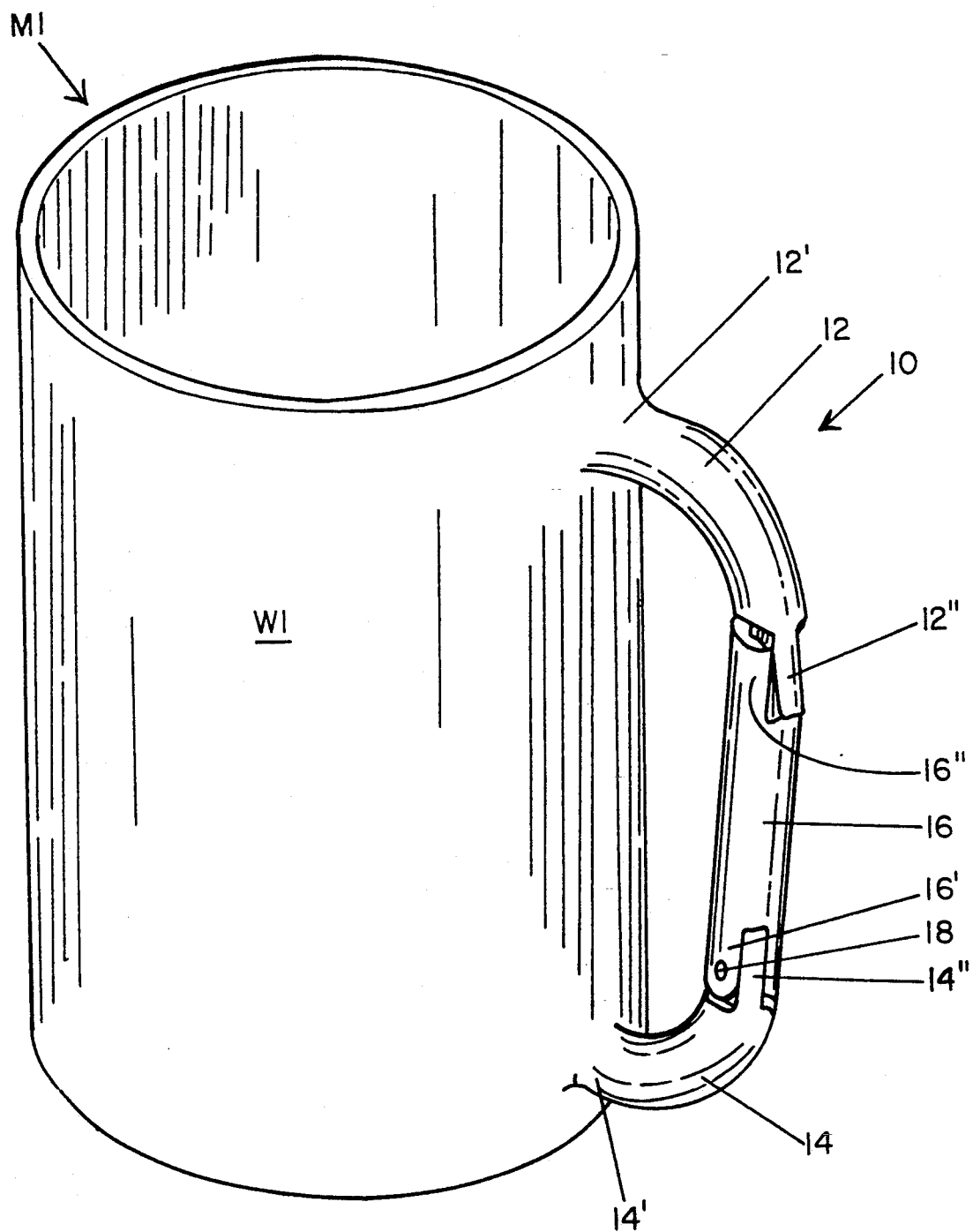
FIG. 1 is a perspective view of a mug having an openable handle attachment constructed in accordance with and embodying the present invention and shown in normal position.
Figure 2:
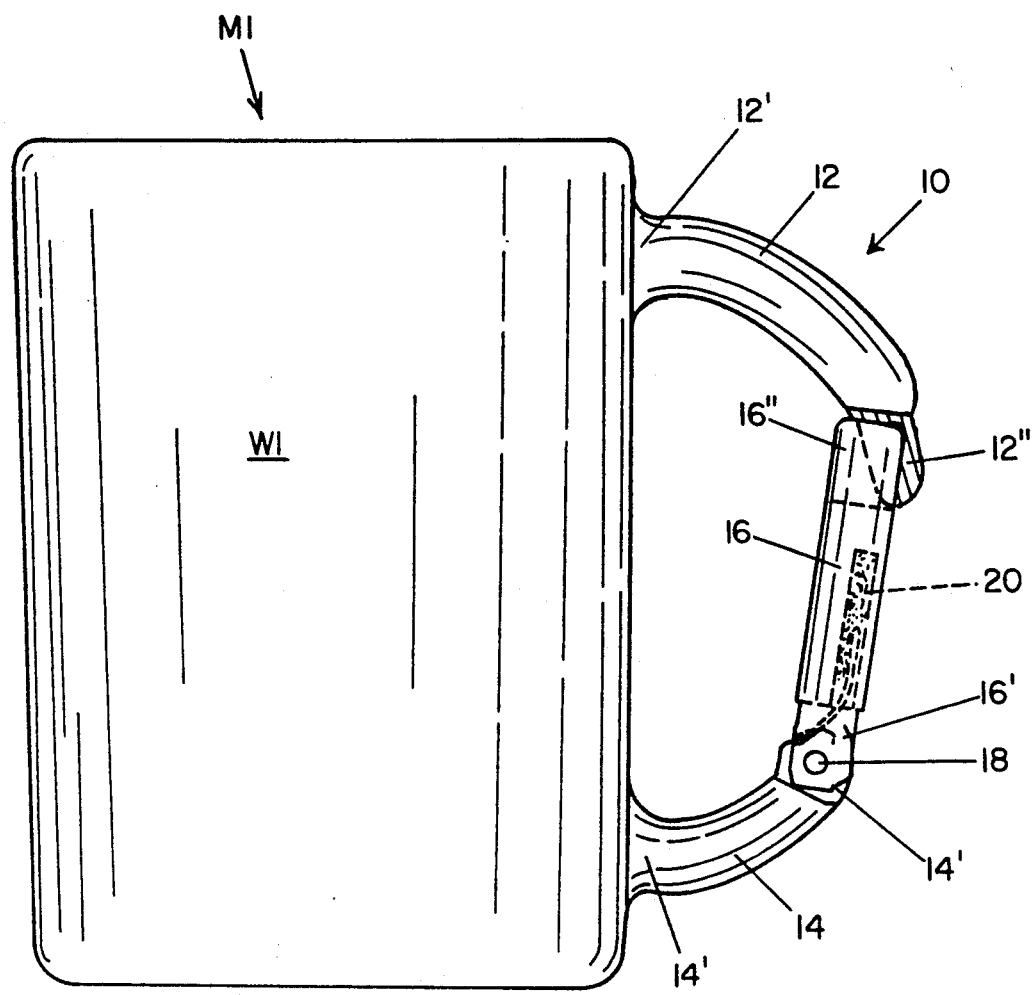
FIG. 2 is a right-handed user front elevational view of the mug of FIG. 1.
Figure 3:
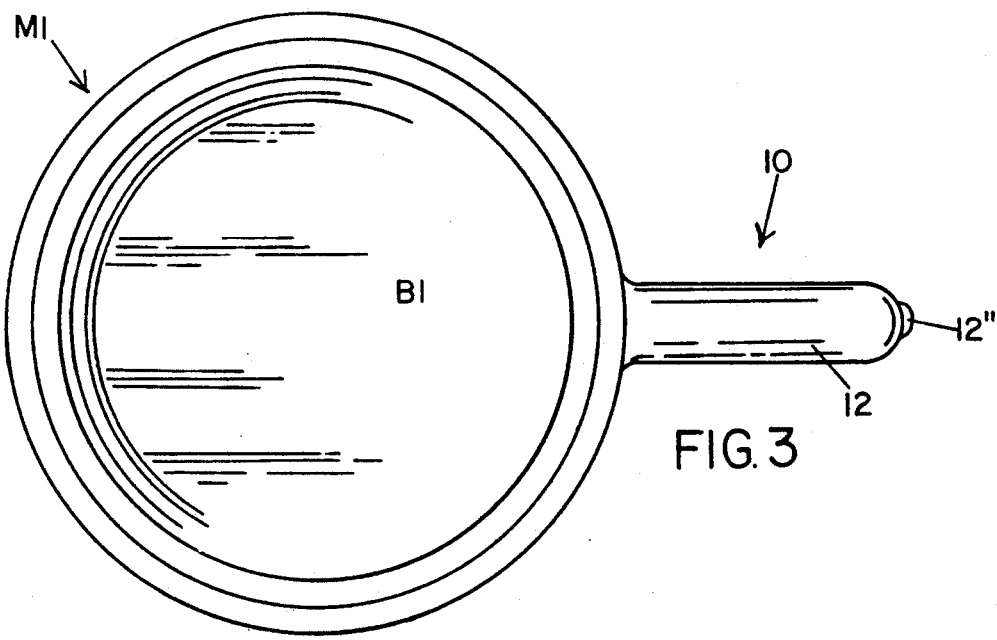
FIG. 3 is a top plan view of the mug of FIG. 1.

Referring to the drawings, illustrated in FIGS. 1 through 4, 16 and 17, and generally designated M1, is a mug, preferably having the overall, general appearance of a conventional coffee cup or mug with a closed bottom B1 and continuous side wall W1 extending upwardly therefrom, but provided with an openable handle attachment, generally designated 10 and embodying the present invention.

Handle 10 preferably has elongated, curved, rigid or semi-rigid upper and lower arms, 12, 14, respectively, which each extend between and terminate in opposed corresponding inner fixed ends 12',14' and outer free ends 12", 14". An elongated, openable central portion 16 extends between free ends 12", 14" of arms 12, 14, so that mug M1 effectively appears to have a conventional carbiner substituted in place of the usual close-formed mug handle, for operation as will be described later.

Each arm 12, 14 of openable handle attachment 10 has one corresponding inner end 12', 14' rigidly fixed preferably directly to mug M1, such that end 12' is substantially vertically, spacedly fixed above end 14' on wall W1. Upper arm 12 extends generally horizontally outward from wall W1 and then preferably curves gradually downward to terminate in a free, outer end 12" which is formed for latching interconnection with a free end 16" of openable center portion 16. Lower arm 14 also extends generally horizontally outwardly from wall W1 of mug M1 and then curves preferably gently upwardly until terminating in free end 14". Free end 14" is desirably pivotally connected by a pin 18 to attached end 16, of openable center portion 16.

Thus handle attachment 10 of mug M1 is intended to operate in openable and reclosable fashion just as a carbiner (such as any of those specified above), and may be repeatedly opened and closed. Handle attachment 10 may have an internal spring member 20 (indicated schematically in phantom in FIGS. 2 and 4) to facilitate reclosing of openable central portion 16 in the usual fashion. This quick, facile use of handle attachment 10 is clearly illustrated in FIGS. 16 and 17.

Figure 16:
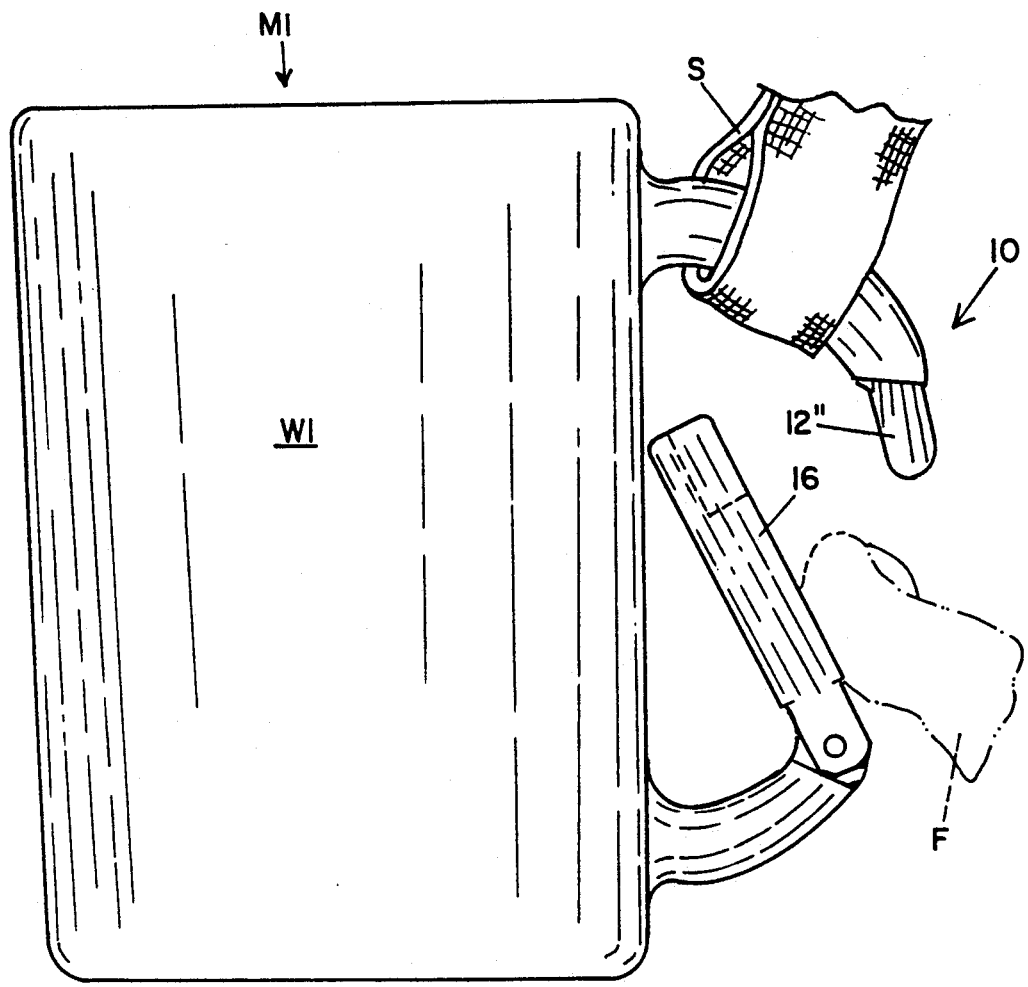
FIG. 16 is a front elevational view of the mug of FIG. 1 shown with the handle attachment in opened position attached to a strap.

In FIG. 16 a finger F is shown in phantom pressing openable center portion 16 inward toward wall W1 of mug M1 so as to leave end 12' of upper arm 12 extending free and unattended so that a strap S may be easily looped thereover. Once strap S is in place, finger F is released from its position and openable center portion 16 then snaps back into its normally latched position in the usual carbiner-like fashion.

Figure 17:
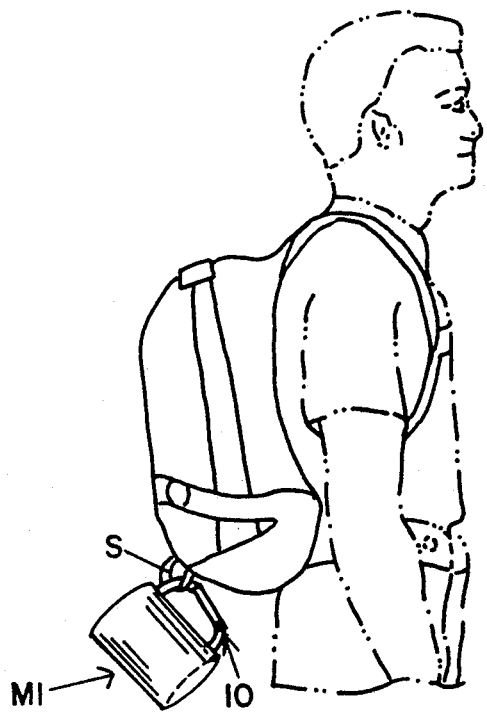
FIG. 17 is a schematic illustration of a person wearing a backpack and showing the mug of FIG. 1 suspended therefrom by the openable handle attachment thereof.

FIG. 17 illustrates mug M1 suspended from strap S on a backpack for ease of carrying without occupying the user's hands. Thus it is readily seen that the new openable handle attachment is of great convenience for college students, hikers, birders, hunters, sports fans, outdoor enthusiasts generally or anyone who wishes to always have a mug or other particular small item readily at hand for quick use and commonly one-handed replacement to its transport position on the backpack, belt, etc. Although only handle attachment 10 is shown in FIGS. 16 and 17, these figures are intended as an example of use which applies to all versions of the new openable handle attachment as illustrated and described.

For purposes of economy of manufacture and convenience of use mug M1 is preferably formed at least partly of plastic, and has handle 10 formed during the molding process as an integral portion thereof. Clearly, although plastic is the preferred material for making openable handle attachment 10, other materials, such as metal, as a whole, or in part, will perform adequately if they permit handle 10 to be at least semi-rigid. Other materials may, however, result in a mug or other article which is heavier to carry and more expensive to produce.

Also, although it is preferred that handle 10 have the general shape shown in FIGS. 1 through 4, and be sized sufficiently large for an adult hand, minor modifications will work just as well. For example, inversion of handles 12, 14 such that the fixed and free ends of openable center portion 16 are reversed will not substantially alter operation of handle 10. Other alternative embodiments are shown in the figures and discussed hereafter.

FIGS. 5, 6 and 7 disclose alternative embodiments of the new openable handle attachment which are illustrated as being attached to coffee-style mugs in like manner as handle 10, but vary therefrom in their respective openable center portions as explained hereafter.

FIG. 5 illustrates a variation of the invention in which a mug, generally designated M2, and partially broken away, has the same general structure as mug M1, with the exception of the openable handle attachment 21 thereof.

Handle attachment 21 is preferably molded as an integral part of mug M2 and has upper and lower arms 22, 24, respectively, connected to wall W2 at their corresponding attached ends 22', 24', as described in the previous embodiment. In this variation, however, arms 22, 24 do not curve quite so gently as in previous handle attachment 10, but rather extend horizontally straight and substantially parallel to each other from wall W2 and then turn inwardly, sharply toward each other at their respective free ends 22", 24", which latter in this case are each hollow.

In the version shown in FIG. 5, openable center portion 26 of handle attachment 21 is generally structured as a spring-mounted sliding bolt arrangement, as described hereafter. Free end 24" of lower handle 24 is formed as a hollow tube and has an elongated groove 25 formed longitudinally, entirely through the tube wall for receipt of and passage therethrough of a peg or knob 27 formed on enclosed end 26' of bolt (center portion) 26. Optionally, a second such groove and knob structure can be formed on handle 21 at a position circumferentially spaced from groove 25.

Housed within hollow free end 24", beneath bolt 26, is a spring 28 (schematically illustrated) for biasing bolt 26 upwardly into the extended position shown so that the upper, free end 26" thereof is normally journaled within the aperture defined by outer end 22" of upper arm 22.

Thus, openable handle attachment 21 is normally closed and functions in the usual stiff handled manner for purposes, for example, of drinking from mug M2. However, when it is desired to attach empty mug M2 to another object, such as a hook, strap or belt for transport it is a simple matter to slide bolt 26 downwardly, by manipulation with the user's finger or thumb, and thereby open handle 21. Mere removal of the operative digit will allow bolt 26 to snap upwardly under the force of spring 28 so as to once again attain the closed position shown, thereby securing mug M2 to the other object (as illustrated in regard to the first embodiment M1).

FIG. 6 illustrates another variation of the invention in which a mug, generally designated M3, and partially broken away, has an openable handle preferably, although not necessarily, attached in the manner described in regard to the previous embodiments to the wall W3 of the mug. In this version, upper and lower arms 32, 34, respectively, of handle 31 extend outwardly from wall W3 in substantially the same arrangement as described in reference to handle 21, shown in FIG. 5. However, the central, openable portion of handle 31 is effectively made up entirely of the free ends 32", 34" of corresponding arms 32, 34.

Ends 32", 34" each taper gradually substantially to a point 35 and extend toward each other until just touching, as shown, or if desired, they may extend so as to overlap somewhat or be formed so as to be interlocking with one another. Being formed preferably of semi-rigid plastic or rubber, ends 32", 34" are intended to be somewhat flexible so that with sufficient pressure they may be manually forced slightly apart to permit passage therebetween of a strap, belt, or the like. Thus, mug M3 may be allowed to dangle freely from such strap, etc., by handle 31 until needed, at which time it may be freed from the suspension device by merely aligning same substantially with the point of juncture of tips 32", 34" and applying sufficient force to overcome the normal bias thereof. Tips 32", 34" will then return to their respective positions, because of flexibility inherent in the material used, to cause handle attachment 31 to again be closed as shown.

FIG. 7 illustrates yet another variation of the invention in which a mug, generally designated M4, has an openable handle 41, which may be manually locked in a closed position or released to an open position. Handle 41 is preferably attached in the manner described in regard to the previous embodiments to the wall W4 of the mug. In this version, upper and lower arms 42, 44, of handle 41 extend outwardly from wall W4 in substantially the same arrangement as described in reference to handle 21, shown in FIG. 5. However, in handle 41 upper arm 42 has an outer, free end 42" which is formed so as to be a hollow tube, in order to receive the free end 46" of an elongated bolt 46 which forms the openable center portion of the handle.

Bolt 46 has an enclosed end 46, which is housed within hollow free end 44" of lower arm 44. Enclosed end 46, of bolt 46 has a knob or peg 48 mounted on its outer surface and sized so as to be capable of slidable movement within an elongated slot 47 formed through the wall of tubular end 44". Knob 48 extends outwardly through and cannot be completely removed from slot 47 and thus assists in preventing complete separation of bolt 46 from handle 41. Slot 47 has an overall "J"-shape and extends longitudinally upwardly along tubular free end 44" until turning sharply and hooking downwardly to terminate in a notch 45 (shown in phantom) into which peg 48 can be fitted for selectively locking handle attachment 41 in a closed position. In this version also, a second knob and groove arrangement can optionally be provided on the opposite side of the openable portion of the handle.

Thus, handle attachment 41 is manually openable, and reclosable, in comparison to the previously described versions of the invention which close automatically. Handle attachment 41 also bears in common with handle attachments 10, 21 and 31 the similarities of being integral with the corresponding attached small object, being sufficiently rigid to permit normal use (i.e. for drinking from a mug), yet is openable for rapid, easy removable connection to another, independent article for suspension therefrom.

There are hereafter described three non-limiting versions of the new openable handle attachment in which each of the corresponding openable center portions are substantially identical to that shown and described with reference to FIGS. 1 through 4. Accordingly, the description of such center portions will not be repeated here. Instead, attention is directed toward the various structures shown and described whereby each of the openable handles is permanently attached to a associated mug in a manner somewhat differently from the others.

FIGS. 8 through 9 illustrate a further embodiment of the invention wherein another version of the new handle, generally designated 51, is integrally connected to a mug M5 in such manner as to permit normal use of the handle when drinking from the mug, but so as also to be openable as described above in respect to the previous embodiments.

Mug M5 has a closed bottom B5 from which there extends upwardly a continuous side wall W5, consistent with the usual coffee mug style, as shown, although variations on the type and shape of cup or mug are certainly foreseen. Extending substantially parallel to each other and generally horizontally outwardly from wall W5, one directly above the other, are integral upper and lower flanges 50a, 50b, respectively, the function of which will be later described.

As in the previous embodiments, handle attachment 51 has an upper arm 52, and a lower arm 54, between the respective free ends 52", 54" of which is located an openable center portion 56. Arms 52, 54 have corresponding inwardly positioned attached ends 52', 54' between which there extends an elongated handle base or back portion 57 which is centrally penetrated by a vertical (longitudinal) bore 58.

Each flange 50a, 50b is provided with a vertically formed aperture 50a, 50b' (shown in phantom), which apertures are aligned, one above the other and sized so as to permit rotatable journaling therein of the corresponding upper and lower ends of a shaft 53. Shaft 53 is rotatably housed within vertical bore 58 and extends at opposed ends thereof through apertures 50a, 50b to terminate outwardly of flanges 50a, 50b in enlarged beads 53a, 53b which prevent complete removal of shaft 53 therefrom. So mounted, openable handle attachment 51 can be swung horizontally from side to side as may be desired for convenient storage. Such rotation is indicated at arrow A in FIG. 8 and is further explained below.

Nonetheless, as in the previous embodiments, for purposes of drinking it is of course desired that handle 51 be maintained in the usual rigid position extending laterally from mug M5. In order to ensure that handle 51 not inadvertently shift from the desired plane, a detent or groove 55 is formed in the underside of flange 50a, as shown in phantom in FIGS. 8 and 9. A spring 59, preferably of the coil variety is positioned surrounding the bottom of shaft 53 beneath base 57 of handle 51 so as to forcibly urge handle base 57 upwardly to engage detent 55, thereby preventing inadvertent sideways rotation of handle 51 during drinking. Optionally, handle 51 can be changed to a folded position out of the normal plane by applying downward force so as to compress spring 59, thus permitting arm end 52, to drop or otherwise be released from detent 55. Handle 51 may then be turned to either the front or back of the normal use plane shown so as to be out of the way for more compact storage of mug M5 or other attached small object.

Figure 10:
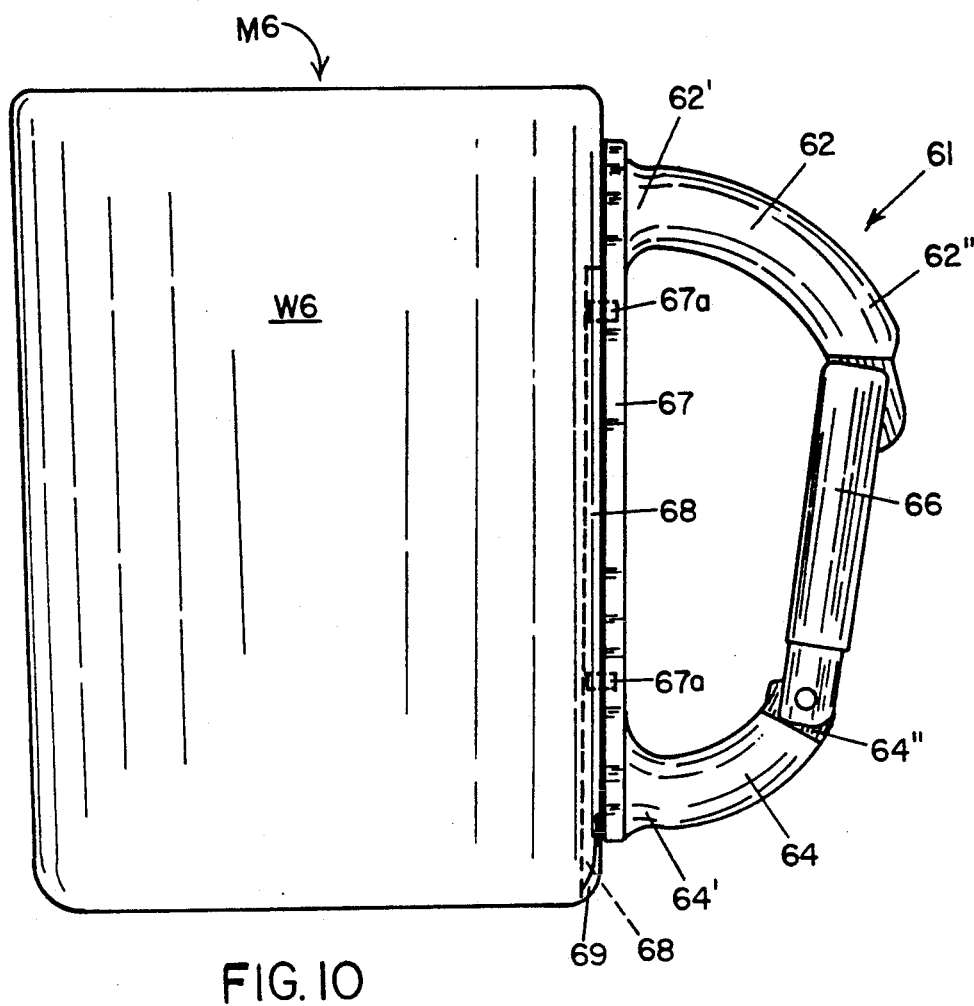
FIG. 10 is a front elevational view of a mug having still another variation of the openable handle attachment constructed in accordance with and embodying the present invention.
Figure 11:
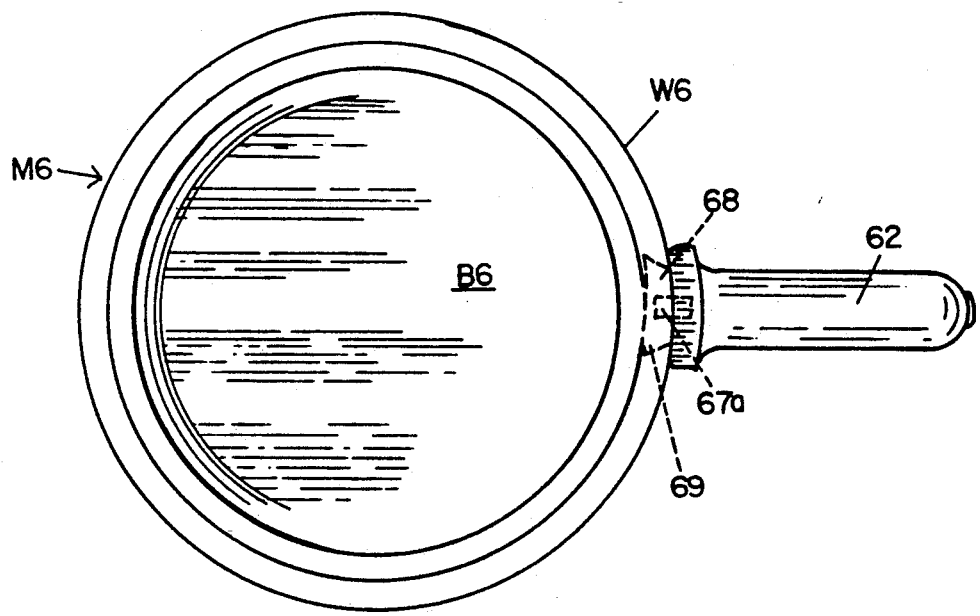
FIG. 11 is a top plan view of the mug of FIG. 10.

A further modification of the new openable handle attachment is illustrated in FIGS. 10 and 11, wherein M6 generally designates a coffee mug having a bottom B6 and continuous side wall W6 extending upwardly therefrom. Mug M6 has a handle 61 with an upper arm 62 and a lower arm 64 and an openable center portion 66 positioned between the respective free ends 62", 64" thereof, in similar fashion as described in the previous embodiments (e.g., FIGS. 1-4).

Handle 61 also has an elongated, flat base portion or back 67 extending between and intersecting ends 62', 64' of arms 62, 64. Base portion 67 serves as an integral mount for attaching handle 61 to mug M6 either by conventional connectors 67a alone (such as screws or pegs, shown in phantom), or by permanent attachment to an elongated truncated, triangular wedge 68, for example by molding thereto. Wedge 68 is in turn connected to mug M6 by slidable insertion into a correspondingly sized and shaped elongated groove or channel 69 having a truncated triangular cross-section (phantom) and being formed vertically (longitudinally) in wall W6. In either case, glue or other sealing means may be added to supplement the bond between handle 61 and mug M6 so that the handle cannot become detached therefrom.

Figure 12:
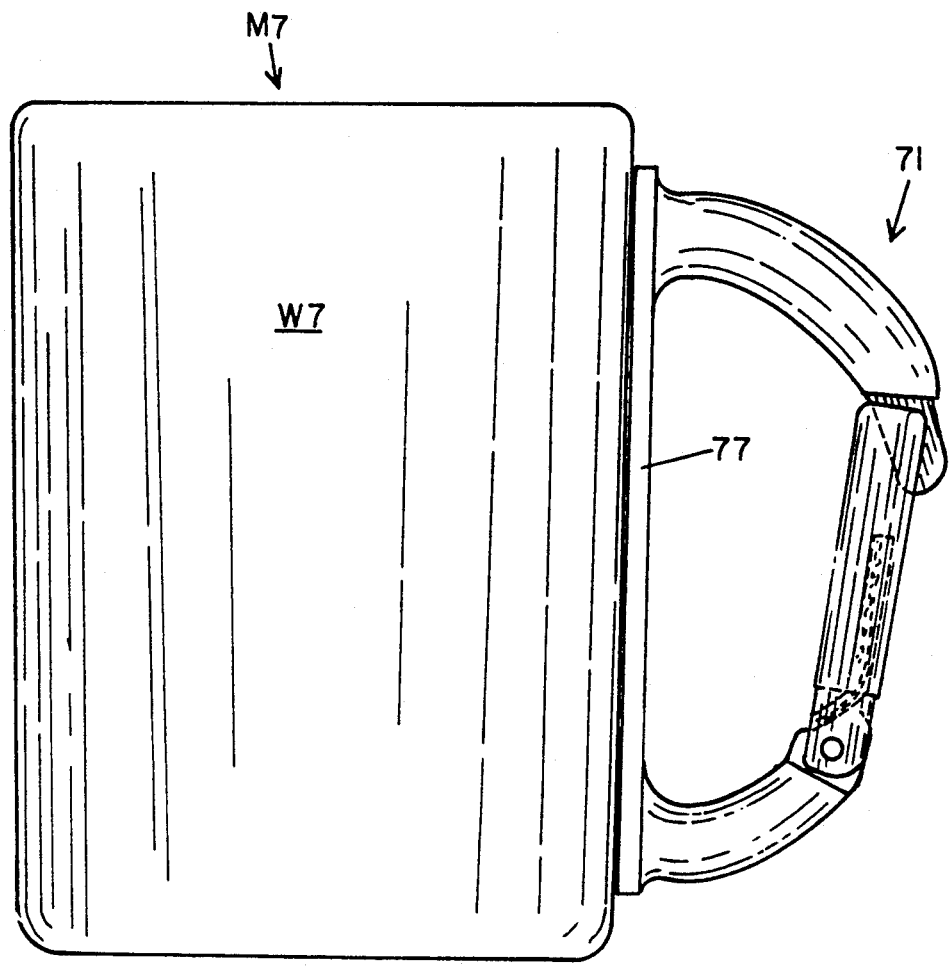
FIG. 12 is a front elevational view of a mug having a still further variation of the openable handle attachment constructed in accordance with and embodying the present invention.
Figure 13:
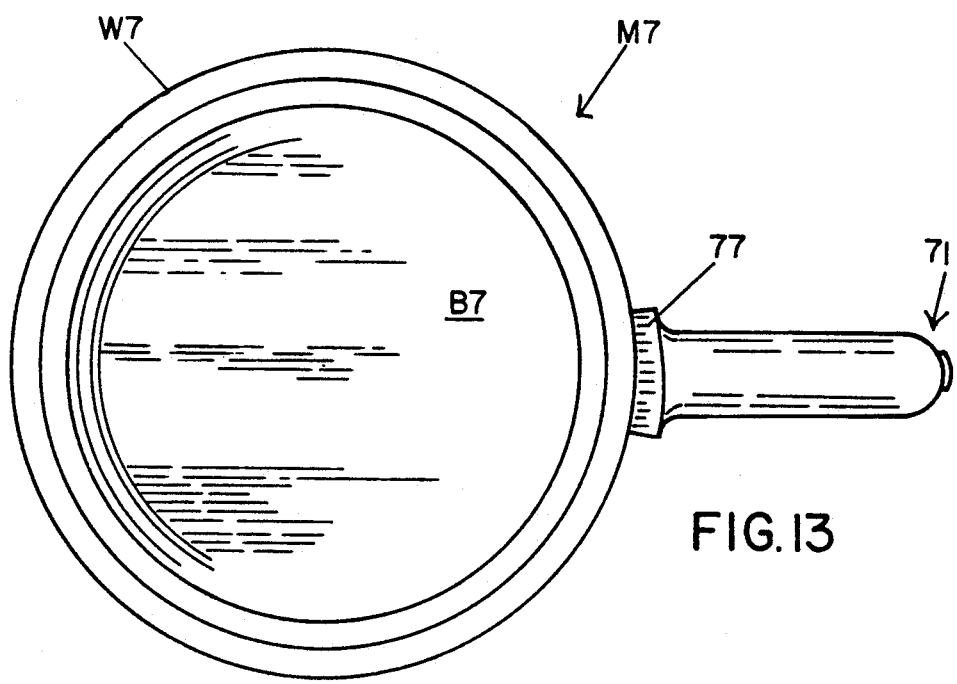
FIG. 13 is a top plan view thereof.

FIGS. 12 and 13 illustrate yet another useful embodiment of the new openable handle attachment, here generally designated 71 and connected to mug M7, which handle and mug are similar in most respects to the embodiment (mug M6) of FIGS. 10 and 11, except that in this case, handle 71 has a base portion 77 which is simply permanently glued to wall W7 of mug M6, rather than requiring screws or other independent means of attachment. Alternatively, handle 71 could be moldably formed simultaneously with mug M6 if the latter is formed of plastic, as with the embodiment earlier described as M1.

Clearly, the new openable handle attachment is useful for a wide variety of relatively objects which are generally considered to be manually portable by one or more persons, such as air tanks, thermos bottles, umbrellas, flashlights, etc., in addition to the mugs just described.

Figure 14:
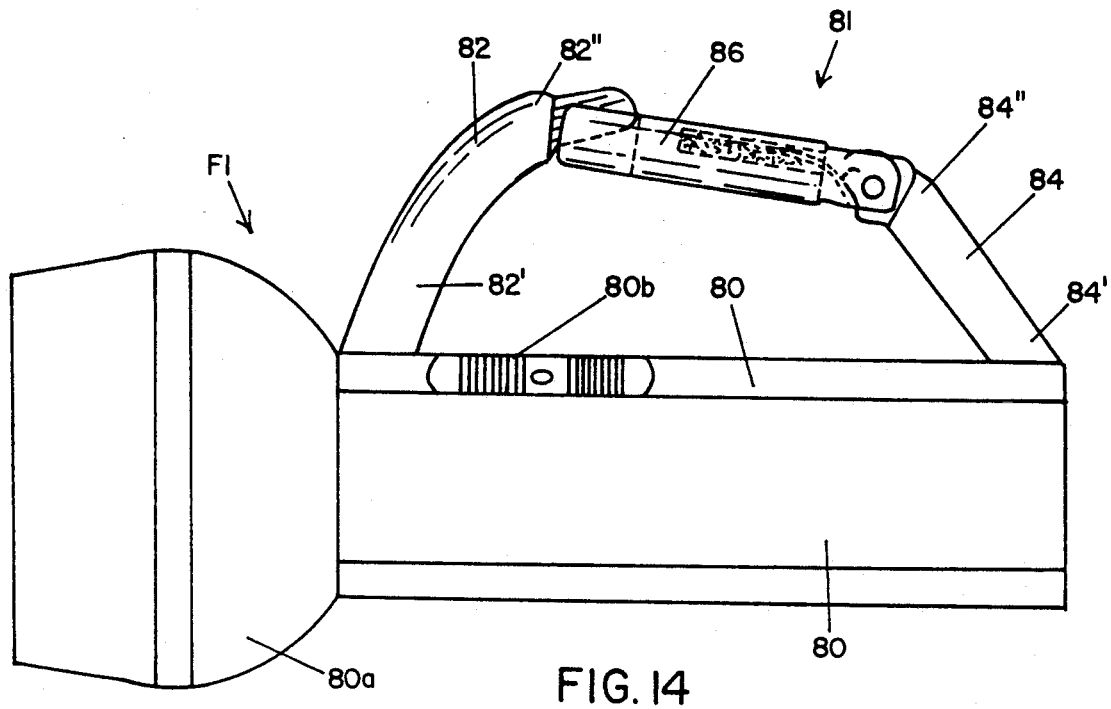
FIG. 14 is a side elevational view of a flashlight having a variation of the openable handle attachment constructed in accordance with and embodying the present invention.
Figure 15:
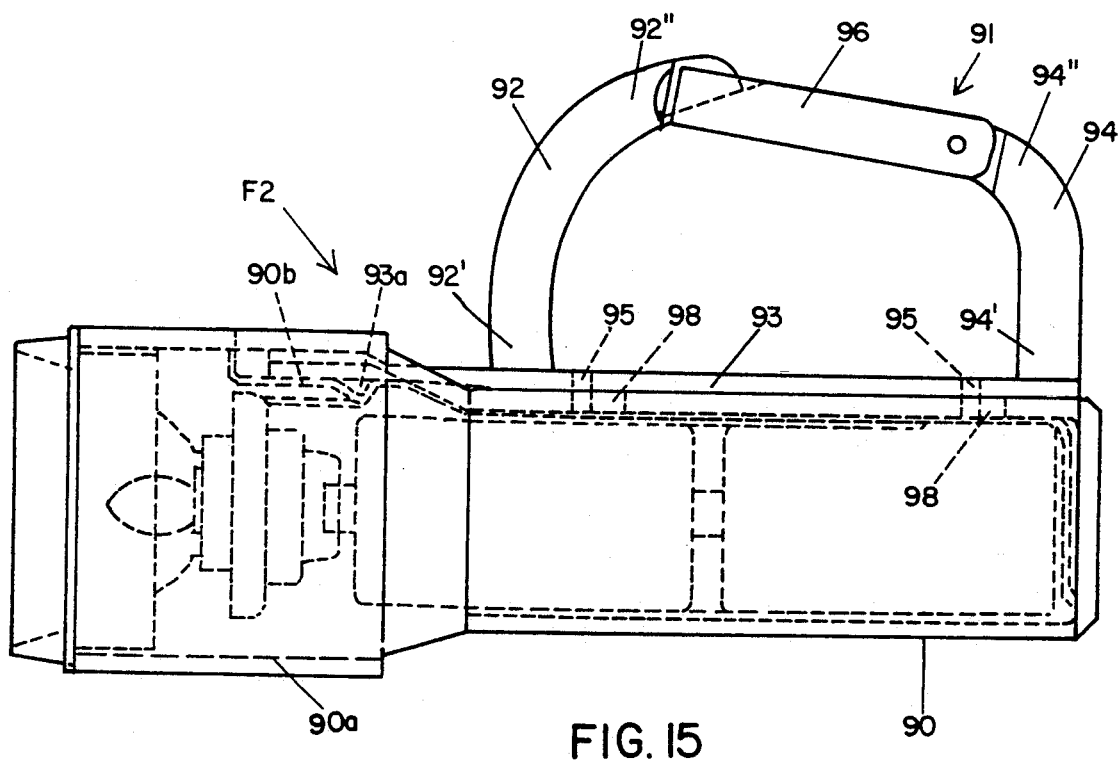
FIG. 15 is a side elevational view of a flashlight having another variation of the openable handle attachment constructed in accordance with and embodying the present invention.

Accordingly, FIGS. 14 and 15 are provided to illustrate examples of such other applications.

FIG. 14 illustrates a flashlight, generally designated F1, preferably of the usual household variety, although other versions can be successfully substituted. Flashlight F1 has a head portion 80a, the usual sliding thumb switch 80b and a cylindrical body portion 80 to which a handle 81, constructed in accordance with the present invention, is attached. Handle 81 has elongated front and back arms 82, 84, respectively, extending between and terminating at opposed corresponding attached ends 82', 84' and free ends 82", 84". Ends 82', 84' are fixed longitudinally spacedly in relation to each other directly to body 80 of flashlight F1, for example, by soldering or spot welding.

Arms 82, 84 are directed generally outwardly and substantially perpendicularly in relation to the longitudinal axis of flashlight F1, and then turn toward each other, with arm 82 arching gently rearwardly and arm 84 extending forwardly at a sharp angle relative to the longitudinal axis of body 80. Free ends 82", 84" define therebetween a space which is occupied by a gate-like openable center portion 86, which is connected to arms 82, 84 and functions in similar manner as described in regard to handle 10 (shown in FIG. 1).

FIG. 15 illustrates another flashlight, generally designated F2. Flashlight F2 is of the conventional variety, preferably having an elongated cylindrical body portion 90 and a light or head portion 90a. Body portion 90 has attached thereto an openable handle 91 constructed in accordance with the invention.

Handle attachment 91 has forward and rearward arms 92, 94 which extend generally perpendicularly outwardly from body portion 90, relative to the longitudinal axis thereof. In this version, as shown, arms 92, 94 each preferably extend initially parallel to each other before gently arching inwardly and terminating in their respective outer ends 92", 94". An openable center portion 96 is connected between outer ends 92", 94" and operates in like fashion as handle 10, previously described.

However, openable handle attachment 91 also has an elongated base plate 93 which extends between and has fixed thereto spaced apart inner attached ends 92', 94', respectively, of arms 92, 94. Base plate 93 may optionally be fixed longitudinally to the outer surface of body 90, for example by molding, soldering, welding, gluing, or by use of connectors 95 (phantom) such as screws, brads, pop rivets, etc., depending in part upon what material is selected for forming flashlight F2. Ordinarily, either plastic or lightweight metal are preferred for economy and convenience.

Although flashlight F2 may be provided with a thumb switch such as that shown in FIG. 14, it preferred that base plate 93 of handle 91 by longitudinally slidably mounted on body 90 so as to be capable of providing the on/off function to flashlight F2.

In this version connectors 95 are permitted to travel in longitudinal tracks 98, shown schematically in phantom in FIG. 15, within body 90. Thus when base plate 93 is in the forward position shown, a nipple 93a formed on the underside of the plate 93 contacts a conventional switch 90b causing operation of flashlight F2. Although the nipple and switch arrangement is shown here to be placed forwardly, within head 90a, other locations in flashlight F2 will clearly suffice. Moreover, it is foreseen that openable handle 91 may be movably connected to flashlight body 90 in a different manner, yet still serve as an on/off switch, for example by contacting the switch to the bulb by transverse rotational movement which is known or by pressure asserted during lifting of the flashlight by the attached openable handle (not shown).

As is clear from the above, numerous variations of the invention are contemplated and many of the various features of the openable handle attachment embodiments described above may be interchanged, one with the other. It is further considered that more than one such handle may be attached to a given article, such as on each side of a soup mug, or spacedly along the outside of a leg of a step ladder, for hanging, or also on opposite sides of a ladder for lifting and moving same. Certainly the length and diameter of subject handle may vary as desired and as is practical in light of the attached object.

Slight variations in shape, material and type of attachment mechanisms will function suitably and the foregoing specific examples are intended only to demonstrate a few of many acceptable versions. For example, the opening member or area need not be exactly centrally located on the handle, and the attached end of either arm may be bifurcated and thus attached at two points so that that arm assumes a "V" shape. Of course, general descriptive terms used throughout the specification, such as "vertically", "horizontal", "longitudinally", etc., indicate general orientation only and may vary depending upon the particular small object to which the new openable handle is attached and with the normal direction of use of such small object.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. The combination of a flashlight and an openable handle therefor, wherein said openable handle comprises an elongated first arm having first and second ends and extending therebetween and an elongated second arm having first and second opposed ends and extending therebetween, said first arm and said second arm each being connected to the flashlight in spaced relation to each other, the first end of said first arm and the first end of said second arm each being connected to the flashlight in such manner that the handle is integrally attached thereto so as not to be removable from the flashlight, the second end of said first arm and the second end of said second arm each extending away from the flashlight attached to said handle and defining therebetween a site for making said handle openable; and means for making said handle openable located at the site between the second end of said first arm and the second end of said second arm and permitting selective passage therethrough of a member from which the flashlight is to be suspended, said handle including an elongated base plate to which said first arm and said second arm are connected, said base plate being movably attached to said flashlight in such manner that movement of said handle will cause said flashlight to be turned on and off.

2. An openable handle for attachment to a portable object, the handle comprising;
an elongated first arm having first and second opposed ends and extending therebetween and an elongated second arm having first and second opposed ends and extending therebetween, said first arm and said second arm each being connected to the object by the corresponding first ends thereof in spaced relation to each other and in such manner that said handle is attached to the object so as not to be separable therefrom, the second end of said first arm and the second end of said second arm each extending outwardly from the object attached to said handle and defining therebetween a site for locating means for making said handle openable; and
means for making said handle openable located at the site between the second end of said first arm and the second end of said second arm and permitting selective passage therethrough of a member from which the object is to be suspended, said means for making said handle openable being automatically recloseable after opening.

3. The openable handle of claim 2, wherein said means for making said handle openable is an elongated member having first and second opposed ends and extending therebetween, the first end of said elongated member being pivotally connected to the second end of one of said first arm and said second arm and the second end of said elongated member including means for selectively openable latchable connection to the second end of the other of said first arm and said second arm.

4. The openable handle of claim 2, wherein said means for making said handle openable is reclosable after opening.

5. The openable handle of claim 2, wherein said means for making said handle openable is repeatedly openable and reclosable.

6. The openable handle of claim 2, wherein said means for making said handle openable includes a spring for effecting automatic reclosing of said portion after opening thereof.

7. The openable handle of claim 2, wherein said means for making said handle openable is made in the form of a latching mechanism of a carbiner.

8. The openable handle of claim 2, wherein means for making said handle openable is comprised of the second end of said first arm and the second end of said second arm, which second ends are each gradually tapered to a point and are positioned substantially adjacent each other and are semi-rigid yet sufficiently flexible to permit passage therethrough of the member from which the object to which said handle is attached is to be suspended.

9. The openable handle of claim 8, wherein said handle is formed entirely of a material selected from the group consisting of plastic and rubber.

10. The openable handle of claim 2, wherein the second end of said first arm is formed with an aperture longitudinally positioned facing said means for making said handle openable;
and wherein the second end of said second arm is hollow and has at least one elongated slot formed longitudinally therethrough;
and further wherein said means for making said handle openable is comprised of a bolt having opposed first and second ends and extending therebetween, the bolt being slidably journaled within the hollow second end of said second arm and having at least one knob attached to the second end thereof, said knob extending outwardly through said elongated slot sufficiently far so as to be easily manipulated, the first end of said bolt being sized and shaped for snug, selectively releasable journaling within the aperture formed in the second end of said first arm;
and a spring, said spring being housed within the hollow second end of said second arm under the second end of said bolt and biasing said bolt toward the aperture formed in the second end of said first arm to thereby maintain said means for making said handle openable in a normally closed position, said means for making said handle openable being openable by manipulation of said knob away from the aperture formed in the second end of said first arm and being automatically reclosable upon release of the knob on said bolt.

11. The openable handle of claim 2, wherein said means for making said handle openable is manually reclosable after opening.

12. The openable handle of claim 11, wherein the second end of said first arm is formed with an aperture longitudinally positioned facing said openable member;
and wherein the second end of said second arm is hollow and has an elongated slot formed therethrough, the slot having a "J"-shaped outer end;
and further wherein said means for making said handle openable is comprised of a bolt having opposed first and second ends and extending therebetween, the first end of said bolt being sized and shaped for snug, selectively releasable journaling within the aperture formed in the second end of said first arm, the bolt having a knob attached to the second end thereof, said knob extending outwardly through said elongated longitudinal slot sufficiently far so as to be easily manipulated to cause movement of said bolt, said bolt being slidably and rotatably housed within the hollow second end of said second arm, whereby longitudinal movement of said knob in said longitudinal slot causes journaling and release of the first end of said bolt in the opening formed in the second end of said first arm, and movement of said knob in said longitudinal slot at the "J"-shaped outer end thereof causes locking and unlocking of said means for making said handle openable so that said handle may be opened for passage therethrough of the member from which the object is to be suspended and secured in a closed position thereafter.

13. The openable handle of claim 2, wherein said openable handle is attached to the object in such manner as to permit selective release from the normal use position of said handle and vertical rotation of said handle in relation to the object attached thereto when said handle is in the released position, as well as facile return of said handle from the released position to the normal use position thereof.

14. The openable handle of claim 13, wherein said handle has a carbiner-like form including an elongated back portion having first and second opposed ends, said first arm intersecting and extending outwardly from the first end of said back portion and said second arm intersecting and extending outwardly from the second end of said back portion, said back portion being penetrated substantially centrally by a longitudinal bore, and further wherein said handle includes a shaft housed within the longitudinal bore of the back portion and having first and second opposed ends which extend longitudinally beyond the corresponding first and second opposed ends of the back portion of said handle and terminate in enlarged beads, and first and second flanges spacedly fixed to the object at a sufficient distance from each other to permit longitudinal mounting therebetween of the back portion of said handle, the first and second flanges having through-holes therein longitudinally aligned and sized for penetration by corresponding first and second opposed ends of the shaft, the first flange having a detent formed therein and shaped for accepting the first end of the back portion, to thereby prevent rotation of said handle until selective release thereof from the normal use position of said handle, the back portion of said handle being mounted on the shaft between the first and second flanges with the enlarged beaded ends of the shaft positioned outwardly of the flanges so as to prevent complete removal of said handle from the object, and a spring positioned coaxially outwardly of the second end of the shaft between the second flange and the second end of the back portion and biasing the back portion toward the first flange with sufficient force to retain said handle in normal use position locked within the detent, to thereby provide a means by which said handle is selectively releasable from the normal use position and rotatably movable in relation to the object to which it is attached.

15. The openable handle of claim 2, wherein said handle has a carbiner-like form including an elongated back portion having first and second opposed ends, said first arm of said handle extending from the first end of said back portion and said second arm of said handle extending from the second end of said back portion, said back portion being longitudinally fixed to the object.

16. The openable handle of claim 15, wherein said back portion is penetrated by a plurality of spaced-apart connectors which also penetrate the object for attaching said openable handle thereto.

17. The openable handle of claim 2, wherein said handle has a carbiner-like form including an elongated back portion having first and second opposed ends, said first arm of said handle intersecting and extending from the first end of said back portion and said second arm of said handle intersecting and extending from the second end of said back portion, said back portion having an integral, longitudinal elongated wedge having a cross-sectional shape of a truncated triangle, the elongated wedge of said back portion being snugly received into a correspondingly shaped channel formed in the object and permanently fixed in such position to thereby attach said handle thereto.

18. The openable handle of claim 2, wherein said handle has a carbiner-like form including an elongated back portion having first and second opposed ends, said first arm of said handle extending from the first end of said back portion and said second arm of said handle extending from the second end of said back portion, and further wherein said back portion is longitudinally fixed to the object by gluing thereto.

19. The openable handle of claim 2, wherein said handle has a carbiner-like form including an elongated back portion having first and second opposed ends, said first arm of said handle extending from the first end of said back portion and said second arm of said handle extending from the second end of said back portion, and further wherein said back portion is longitudinally fixed to the object by molding thereto.

20. The openable handle of claim 2, wherein said openable portion may be opened by pressure from a single finger and will automatically return to normally closed position upon release of such pressure.

21. The combination of a mug and an openable handle therefor, wherein said openable handle comprises an elongated first arm having first and second ends and extending therebetween and an elongated second arm having first and second opposed ends and extending therebetween, said first arm and said second arm each being connected to the mug in spaced relation to each other, the first end of said first arm and the first end of said second arm each being connected to the mug in such manner that the handle is integrally attached thereto so as not to be removable from the mug, the second end of said first arm and the second end said second arm each extending away from the mug attached to said handle and defining therebetween a site for making said handle openable; and means for making said handle openable located at the site between the second end of said first arm and the second end of said second arm and permitting selective passage therethrough of a member from which the mug is to be suspended, said means for making said handle openable being automatically recloseable after opening.

* * * * *